(12) United States Patent
Gosling et al.

(10) Patent No.: US 9,982,204 B2
(45) Date of Patent: May 29, 2018

(54) PROCESS FOR PRODUCING A CHEMICAL FEEDSTOCK AND APPARATUS RELATING THERETO

(71) Applicant: UOP LLC, Des Plaines, IL (US)

(72) Inventors: Christopher D. Gosling, Roselle, IL (US); Gavin P. Towler, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 494 days.

(21) Appl. No.: 14/277,475

(22) Filed: May 14, 2014

(65) Prior Publication Data

US 2014/0371497 A1 Dec. 18, 2014

Related U.S. Application Data

(60) Provisional application No. 61/834,490, filed on Jun. 13, 2013.

(51) Int. Cl.

| | | |
|---|---|---|
| C10G 69/04 | (2006.01) | |
| C10G 69/06 | (2006.01) | |
| C10G 69/12 | (2006.01) | |
| B01D 3/00 | (2006.01) | |
| C10G 25/03 | (2006.01) | |

(Continued)

(52) U.S. Cl.

CPC ............ *C10G 69/04* (2013.01); *B01D 3/009* (2013.01); *C10G 25/03* (2013.01); *C10G 50/00* (2013.01); *C10G 69/00* (2013.01); *C10G 69/06* (2013.01); *C10G 69/126* (2013.01); *C10G 2300/301* (2013.01); *C10G 2400/30* (2013.01)

(58) Field of Classification Search

CPC ...... C10G 69/04; C10G 69/126; C10G 69/06; C10G 25/03; C10G 50/00; C10G 69/00; B01D 3/009

See application file for complete search history.

(56) References Cited

U.S. PATENT DOCUMENTS 6,228,254 B1 * 5/2001 Jossens ................ C10G 45/04
                                                                208/209
7,112,307 B2    9/2006 Abrevaya et al.
(Continued)

FOREIGN PATENT DOCUMENTS

WO       2013052232 A1    4/2013

OTHER PUBLICATIONS

International Maritime Organization ("Gas Oils (petroleum), heavy vacuum" IMO (International Maritime Organization) MSDS per SOLAS regulation Vl/5-1, Pub. Aug. 6, 2012).*

(Continued)

*Primary Examiner* — Brian A McCaig
*Assistant Examiner* — Jason Y Chong

(57) ABSTRACT

One exemplary embodiment can be a process for producing a chemical feedstock. The process can include passing a feed to a hydrotreatment zone, passing an effluent from the hydrotreatment zone to a fractionation zone, passing a stream including one or more C5-C25 hydrocarbons from the fractionation zone to a fluid catalytic cracking zone to obtain an another stream including one or more C6-C10 hydrocarbons, and passing the another stream to an adsorption zone for removing at least one heteroatom compound having a sulfur or a nitrogen atom.

15 Claims, 1 Drawing Sheet

(51) Int. Cl.
*C10G 50/00* (2006.01)
*C10G 69/00* (2006.01)

(56) References Cited

U.S. PATENT DOCUMENTS

| | | | |
|---|---|---|---|
| 7,316,773 B2 | 1/2008 | Zhang et al. | |
| 7,491,315 B2 | 2/2009 | Eng et al. | |
| 7,611,622 B2 | 11/2009 | Niccum et al. | |
| 8,088,335 B2 | 1/2012 | Long et al. | |
| 8,124,020 B2 | 2/2012 | Couch et al. | |
| 2003/0000867 A1* | 1/2003 | Reynolds | C10G 65/00 208/89 |
| 2004/0118749 A1 | 6/2004 | Lesemann et al. | |
| 2005/0263441 A1 | 12/2005 | Antonio et al. | |
| 2006/0260981 A1* | 11/2006 | Gosling | C10G 11/05 208/59 |
| 2010/0034708 A1 | 2/2010 | Thakkar et al. | |
| 2011/0240519 A1 | 10/2011 | Jan et al. | |
| 2012/0123179 A1 | 5/2012 | Qi et al. | |
| 2012/0241359 A1* | 9/2012 | Al-Thubaiti | B01J 8/26 208/61 |
| 2013/0211161 A1* | 8/2013 | Feugnet | C10G 69/126 585/251 |

OTHER PUBLICATIONS

Search Report dated Sep. 25, 2014 for corresponding PCT Appl. No. PCT/US2014/039897.

Moura, "Heat of Cracking for Naphtha in FCC Units Risers", 2006 AIChE Spring National Meeting, Apr. 23-27, 2006. ISBN—10: 0816910057, ISBN—13: 9780816910052.

Sha, "A New Process for Ethylene Production: Heavy Oil Contact Cracking Process", Petroleum Processing and Petrochemicals (ISSN 1005-2399), V26 N.6 9-14 (Jun. 1995), v 26, n 6, p. 9-14, Jun. 1995; Language: Chinese; ISSN: 10052399; Publisher: SINOPEC, Research Institute of Petroleum Processing.

Stratiev, "Alternative Upgrading of C4 Ethylene Plant Stream", Oil Gas European Magazine, v 32, n 2, p. 74-76, Jun. 2006; ISSN: 03425622; Publisher: Urban Verlag Hamburg/Wien GmbH.

* cited by examiner

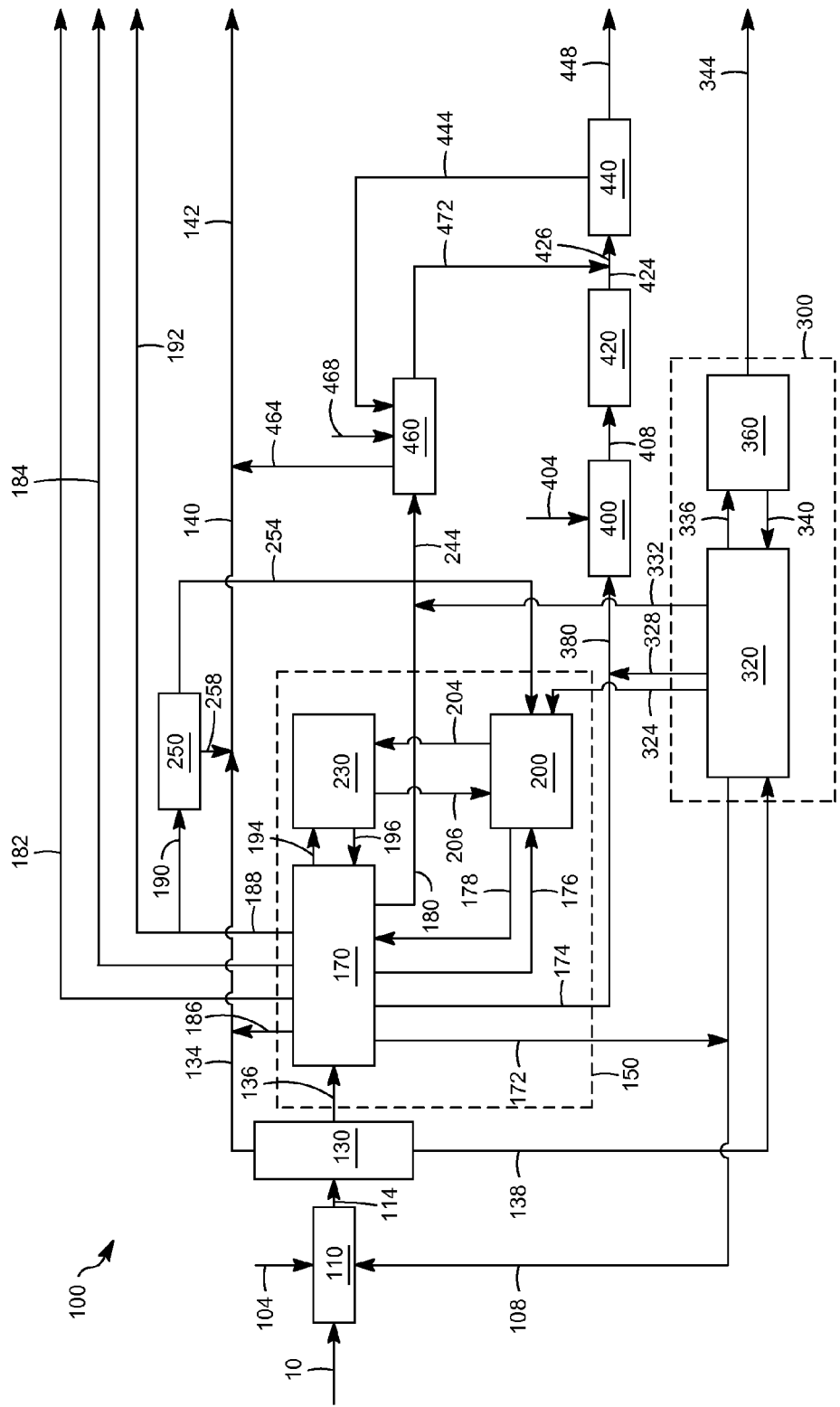

PROCESS FOR PRODUCING A CHEMICAL FEEDSTOCK AND APPARATUS RELATING THERETO

CROSS-REFERENCE TO RELATED APPLICATION

This application claims priority from Provisional Application No. 61/834,490 filed Jun. 13, 2013, the contents of which are hereby incorporated by reference.

FIELD OF THE INVENTION

This invention generally relates to a process for producing a chemical feedstock and an apparatus relating thereto.

DESCRIPTION OF THE RELATED ART

Usually, petrochemicals are made by converting refined oil fractions. However, using previously refined oil fractions can have added costs due to refining energy costs. Hence, there is a desire to lower conversion costs by manufacturing petrochemicals in a more direct and efficient manner.

SUMMARY OF THE INVENTION

One exemplary embodiment can be a process for producing a chemical feedstock. The process can include passing a feed to a hydrotreatment zone, passing an effluent from the hydrotreatment zone to a fractionation zone, passing a stream including one or more C5-C25 hydrocarbons from the fractionation zone to a fluid catalytic cracking zone to obtain an another stream including one or more C6-C10 hydrocarbons, and passing the another stream to an adsorption zone for removing at least one heteroatom compound having a sulfur or a nitrogen atom.

Another exemplary embodiment can be an apparatus for producing a chemical feedstock. The apparatus may include a fluid catalytic cracking zone, a gasoline hydrotreatment zone communicating via a line with the fluid catalytic cracking zone for receiving one or more C6-C10 hydrocarbons, and an adsorption zone communicating via another line with the gasoline hydrotreatment zone for receiving a hydrotreated effluent.

A further exemplary embodiment may be a process for producing a chemical feedstock. The process can include passing a feed to a hydrotreatment zone, passing an effluent from the hydrotreatment zone to a fractionation zone, passing a stream including one or more C5-C25 hydrocarbons to a fluid catalytic cracking zone, passing a stream having one or more $C22^+$ hydrocarbons to an another fluid catalytic cracking zone to obtain a first stream having one or more C6-C10 hydrocarbons and a second stream having one or more C13-C18 hydrocarbons, passing the first stream to a riser in the fluid catalytic cracking zone, and passing the second stream to a hydrocracking zone.

In one exemplary embodiment, a hydrotreatment zone processes a crude feed and adds hydrogen to the crude for further refining. The embodiments disclosed herein can utilize a three riser fluid catalytic cracking system to convert crude petroleum to high value ethene, propene, butenes, and BTX. Often, the hydrotreated crude is then split in a subatmospheric pressure column into a fraction lighter than about 455° C. and a fraction heavier than about 455° C. The embodiments disclosed herein can use a three riser fluid catalytic cracking system for converting high value ethene, propene, butenes, benzene, toluene, and xylenes. The heavier fraction may be converted to lighter products in a fluid catalytic cracking zone using a low activity catalyst. A regenerator in the zone can either be a full combustion regenerator or a partial combustion regenerator that desirably produces a syngas product that can be further processed for producing ketones and alcohols that, in turn, can be used to make desired chemical products, such as plastics and/or polymers.

The lighter product may be converted to a feedstock for petrochemicals in a fluid catalytic cracking zone having a light naphtha cracking riser to maximize the production of ethene, propene, and one or more butenes. The fluid catalytic cracking zone may utilize a high activity Y catalyst combined with ZSM-5 additive. Optionally, the one or more butenes may be passed through an optional oligomerization unit should, e.g., such oligomerization be desirable due to market conditions. In such an instance, the oligomerized butenes can be recycled to a light naphtha riser to make additional propene.

BTX production can be maximized by using a hydrocracking zone to convert the bi-cyclic hydrocarbons to single ring aromatics. In one desired embodiment, the hydrocracked effluent is combined with a hydrotreated heavy naphtha from two fluid catalytic cracking zones and then extracted to recover BTX.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3-$, which is inclusive of the abbreviated one or more hydrocarbons. As an example, the abbreviation "$C3^+$" means one or more hydrocarbon molecules of three carbon atoms and/or more. A "stream" may also be or include substances, e.g., fluids or substances behaving as fluids, other than hydrocarbons, such as air, hydrogen, or particulate catalyst.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

The term "crude oil feed" can refer to any full range crude oil from primary, secondary or tertiary recovery from conventional or offshore oil fields and may also include any full range "syncrude" such as those that can be derived from coal, shale oil, tar sands and bitumens. The crude may be virgin, such as straight run, or generated synthetically by blending. It is generally desirable, however, to first desalt the crude since sodium chloride is known to be a poison for most cracking operations. An exemplary crude oil feed is disclosed in, e.g., U.S. Pat. No. 4,992,160.

As used herein, the term "aromatic" can refer to a group containing one or more rings of unsaturated cyclic carbon radicals where one or more of the carbon radicals can be replaced by one or more non-carbon radicals. An exemplary aromatic compound is benzene having a C6 ring containing three double bonds. Moreover, characterizing a stream or zone as "aromatic" can imply one or more different aromatic compounds.

As used herein, the term "naphtha stream" can refer to one or more C5-C12 hydrocarbons and having a boiling point of about 25° to about 190° C. at atmospheric pressure.

As used herein, the term "light naphtha stream" can refer to one or more C5-C6 hydrocarbons and having a boiling point of about 25° to about 90° C. at atmospheric pressure.

As used herein, the term "heavy naphtha stream" can refer to one or more C6-C10 hydrocarbons and having a boiling point of about 85° to about 190° C. at atmospheric pressure.

As used herein, the term "light cycle oil" can refer to one or more C13-C18 hydrocarbons and having a boiling point of about 200° to about 345° C. at atmospheric pressure.

As used herein, the term "clarified slurry oil" can refer to one or more C16-C25 hydrocarbons and having a boiling point of about 340° to about 530° C. at atmospheric pressure.

As used herein, the terms "ethylene" and "ethene", and "propylene" and "propene" can be used interchangeably.

As used herein, the compounds butene, toluene, and xylenes may be abbreviated collectively as "BTX".

As used herein, the term "hour" may be abbreviated "hr", the term "kilogram" may be abbreviated "kg", the term "kilopascal" may be abbreviated "KPa", and the terms "degrees Celsius" may be abbreviated "° C.". All pressures are absolute.

As depicted, process flow lines in the figures can be referred to interchangeably as, e.g., lines, pipes, feeds, effluents, products, alkanes, alkenes, hydrocarbons, parts, portions, or streams.

BRIEF DESCRIPTION OF THE DRAWING

The FIGURE is a schematic depiction of an exemplary chemical feedstock production apparatus.

DETAILED DESCRIPTION

Referring to the FIGURE, a chemical or petrochemical feedstock production apparatus 100 can include a hydrotreatment zone 110, a fractionation zone 130, a fluid catalytic cracking zone 150, an oligomerization zone 250, a another fluid catalytic cracking zone 300, a gasoline hydrotreatment zone 400, an adsorption zone 420, a BTX extraction zone 440, and a hydrocracking zone 460. A crude oil feed 10 can be provided to the apparatus 100. Generally, the crude oil feed 10 is provided to the hydrotreatment zone 110 that can also receive a hydrogen stream 104 and a recycle stream 108, having a clarified slurry oil, from the another fluid catalytic cracking zone 300.

The hydrotreatment zone 110 can include a fixed, ebullated, slurried or fluidized catalyst bed. Usually, the hydrotreatment zone 110 is maintained at a pressure of about 2,100 to about 14,000 KPa, and a temperature of about 170° to about 460° C. Further preferred operating conditions include a liquid hourly space velocity of about 0.2 to about 10 hr$^{-1}$, and hydrogen circulation rates of about 35 to about 1,800 m$^3$/m$^3$. The hydrotreatment zone 110 can include a catalyst with a metallic component having desired hydrogenation activity deposited on a suitable refractory inorganic oxide carrier material of either synthetic or natural origin. Preferred carrier materials are alumina, silica and mixtures thereof. Suitable metallic components having hydrogenation activity are those selected from the group including metals of groups 6 and 8-10 of the periodic table, and may include one or more metals of molybdenum, tungsten, chromium, iron, cobalt, nickel, platinum, iridium, osmium, rhodium, ruthenium, and mixtures thereof. Exemplary concentrations of a metal from group 6 may be present in an amount of about 1 to about 20%, by weight, and of a metal from groups 8-10 can be present in an amount of about 0.2 to about 10%, by weight. An exemplary hydrotreatment zone 110 is disclosed in, e.g., U.S. Pat. No. 4,719,007.

The hydrotreatment zone 110 can provide an effluent 114, typically a hydrotreated effluent 114, to a fractionation zone 130. The fractionation zone 130 can include any suitable fractionation column, such as a sub-atmospheric pressure column, that may split the hydrotreated effluent 114 into a fraction lighter than about 455° C., and a fraction heavier than about 455° C. In this exemplary embodiment, the fractionation zone 130 can provide an overhead stream 134 including one or more C4− hydrocarbon alkanes, a sidestream 136 including one or more C5-25 hydrocarbons having a boiling point of about 25° to about 410° C., and a bottom or an additional stream 138 including one or more C22$^+$ hydrocarbons having a boiling point of at least about 370° C. The overhead stream 134 can be combined with one or more C4− alkanes stream 258 from the oligomerization zone 250, as hereinafter described, to form a combined stream 140, which, in turn, may be combined with one or more C4− alkanes 464 from the hydrocracking zone 460, as hereinafter described, to form an aggregated stream 142 that can be provided to any suitable destination, such as a sulfur plant and/or a fuel gas header. Generally, the side-stream 136 is provided to the fluid catalytic cracking zone 150 and the bottom stream 138 is provided to the another fluid catalytic cracking zone 300, as hereinafter described.

The fluid catalytic cracking zone 150 may include a first riser reactor 170, a second riser reactor 200, and a combustion regenerator 230. The riser reactors 170 and 200 can share the combustion regenerator 230. The side-stream 136 may be provided as a feed to the first riser reactor 170.

The first riser reactor 170 may include a riser and a reactor vessel. A regenerator catalyst pipe can deliver a regenerated catalyst stream 196 from the combustion regenerator 230 to the riser. Typically, a fluidization medium such as steam from a distributor urges a stream of regenerated catalyst upward through the riser. At least one feed distributor can inject the first hydrocarbon feed in a first hydrocarbon feed line, preferably with an inert atomizing gas such as steam, across the flowing stream of catalyst particles to distribute hydrocarbon feed to the riser. Upon contacting the hydrocarbon feed with catalyst in the riser the hydrocarbons may crack to produce lighter gaseous cracked products while coke can be deposited on the catalyst particles to produce spent catalyst.

Often, the resulting mixture of gaseous product hydrocarbons and spent catalyst continues upward through the riser and are received in the reactor vessel in which the spent catalyst and gaseous product are separated. Usually, disengaging arms discharge the mixture of gas and catalyst from a top of the riser through the outlet ports into a disengaging vessel that may effect partial separation of gases from the catalyst. A transport conduit may carry the hydrocarbon vapors, stripping media and entrained catalyst to one or more cyclones in the reactor vessel that can separate spent catalyst from the hydrocarbon gaseous product stream. Generally, gas conduits deliver separated hydrocarbon cracked gaseous streams from the cyclones to a collection plenum for passage of a cracked product stream. Optionally, the cracked product stream can be sent to a distillation column to provide various hydrocarbon fractions provided in one or more lines, namely lines 172, 174, 176, 180, 182, 184, 186 and 188.

Diplegs discharge catalyst from the cyclones into a lower bed in the reactor vessel. The catalyst with adsorbed or entrained hydrocarbons may eventually pass from the lower bed into a stripping section across ports defined in a wall of the disengaging vessel. Catalyst separated in the disengaging vessel may pass directly into the stripping section via a bed. A fluidizing distributor delivers inert fluidizing gas, typically steam, to the stripping section. Generally, the stripping section contains baffles or other equipment to promote contacting between a stripping gas and the catalyst. Usually, the stripped spent catalyst leaves the stripping section of the disengaging vessel of the reactor vessel stripped of hydrocarbons. Often, a first portion of the spent catalyst, preferably stripped, leaves the disengaging vessel of the reactor vessel through a spent catalyst conduit and passes into the combustion regenerator 230. A second portion of the spent catalyst may be recirculated in recycle conduit from the disengaging vessel back to a base of the riser at a rate regulated by a slide valve to recontact the feed without undergoing regeneration.

The riser of the riser reactor 170 can operate at any suitable temperature, and typically operates at a temperature of about 150° to about 580° C. at the riser outlet, and a pressure of about 60 to about 520 KPa. The catalyst-to-oil ratio, based on the weight of the catalyst and feed hydrocarbons entering the riser, may range up to about 30:1. The average residence time of catalyst in the riser may be less than about 5 seconds.

The catalyst in the riser reactor 170 can be a single catalyst or a mixture of different catalysts. Such a catalyst mixture is disclosed in, e.g., U.S. Pat. No. 7,312,370. Generally, a catalyst mixture can include a large pore zeolite, such as a Y-type zeolite, an active alumina material, a binder material, including either silica or alumina, and an inert filler such as kaolin, and a medium or smaller pore catalyst, such as exemplified by at least one of ZSM-5, ZSM-11, ZSM-12, ZSM-23, ZSM-35, ZSM-38, ZSM-48, ferrierite, and erionite, optionally dispersed on a matrix. Preferably, the fluid catalytic cracking zone 150 may utilize a high activity Y catalyst combined with ZSM-5 additive. These catalysts may have a crystalline zeolite content of about 10 to about 50%, by weight, or more, and a matrix material content of about 50 to about 90%, by weight. The total catalyst mixture in the riser reactor 170 may contain about 1 to about 25%, by weight, of the medium to small pore catalyst. The larger pore catalyst may comprise the balance of the catalyst composition.

Usually, the combustion regenerator 230 is in downstream communication with the riser reactor 170. In the combustion regenerator 230, coke is often combusted from the portion of spent catalyst delivered to the combustion regenerator 230 by contact with an oxygen-containing gas such as air to regenerate the catalyst. The spent catalyst conduit 194 can convey spent catalyst to the combustion regenerator 230. An oxygen-containing combustion gas, typically air, may be provided to the combustion regenerator 230. The oxygen in the combustion gas contacts the spent catalyst and combusts carbonaceous deposits from the catalyst to at least partially regenerate the catalyst and generate flue gas, which may be discharged.

Substantially complete or partially regenerated catalyst may exit the top of a transport, riser section. Generally, discharge is effected through a disengaging device that separates a majority of the regenerated catalyst from the flue gas. The catalyst and gas exit downward from the disengaging device. The sudden loss of momentum and downward flow reversal cause a majority of the heavier catalyst to fall to a dense catalyst bed and the lighter flue gas and a minor portion of the catalyst still entrained therein to ascend upward in an upper chamber. Cyclones may further separate catalyst from ascending gas and deposits catalyst through dip legs into a dense catalyst bed.

The combustion regenerator 230 typically has a temperature of about 590° to about 760° C. Regenerated catalyst from a dense catalyst bed can be transported in a line 196 through a regenerated catalyst pipe from the combustion regenerator 230 back to the riser reactor 170 through a control valve where contacting of the side-stream 136 may continue.

Thus, the first riser reactor 170 can produce a cracked product stream that can be fractionated into ethene in the line 182, propene in the line 184, one or more butenes in the line 188, one or more C4− alkanes in the line 186, a clarified slurry oil in the line 172, a heavy naphtha in the line 174, a light naphtha in the line 176, and a light cycle oil in the line 180. The ethene in the line 182 and the propene in the line 184 may be sent as a feedstock to a chemical manufacturing plant for making polymers and/or plastics.

The butenes in the line 188 can be split to provide a butene feed or a hydrocarbon stream 190 having C4 hydrocarbons including C4 butenes and perhaps having C5 hydrocarbons including C5 pentenes to the oligomerization zone 250, and butenes in a line 192 that can be sent to a chemical manufacturing plant for making plastics and/or polymers. The light naphtha in the line 176 can be recovered from the distillation column and provided to the second riser reactor 200. The second riser reactor 200 may also receive light naphtha in the line 324 from the another fluid catalytic cracking zone 300 and an oligomerized effluent in the line 254 from the oligomerization zone 250, as hereinafter described. The light naphtha can be contacted with a regenerated catalyst stream 206 delivered to the second riser reactor 200 by a catalyst return pipe to produce cracked upgraded products. The catalyst may be fluidized by inert gas such as steam from a distributor. Generally, the second riser reactor 200 may operate under conditions to convert the light naphtha to C5-C6 alkenes provided in a line 178 back to the first riser reactor 170 for making, e.g., additional propene. Typically, a reactor vessel is in downstream communication with a riser for receiving second cracked products and catalyst from the riser. Usually, the mixture of gaseous, second cracked product hydrocarbons and catalyst continues upward through the riser and is received in a reactor vessel in which the catalyst and gaseous, second cracked products are separated. A pair of disengaging arms may tangentially and horizontally discharge the mixture of gas and catalyst from a top of the reactor riser through one or more outlet ports into the reactor vessel that can effect partial separation of gases from the catalyst. The catalyst can drop to a dense catalyst bed within the second reactor vessel. Cyclones in the reactor vessel may further separate catalyst from cracked products.

In some embodiments, the second riser reactor 200 can contain a single catalyst or a mixture of catalysts as described above for the first riser reactor 170. In one preferred embodiment, the second riser reactor 200 can contain only a ZSM-5 zeolite, or a combination of a Y- and ZSM-5 zeolites.

Generally, the second riser reactor 200 is in downstream communication with the combustion regenerator 230 and receives a regenerated catalyst stream 206 therefrom. The combustion regenerator 230 can receive a spent catalyst stream 204 from the second riser reactor 200.

The second riser reactor 200 can operate in any suitable conditions, such as a temperature of about 425° to about 705° C., and a pressure of about 140 to about 400 KPa. Typically, the residence time of the second riser reactor 200 can be less than about 3 seconds and, preferably, is than about 1 second. Exemplary risers and operating conditions are disclosed in, e.g., US 2008/0035527 A1 and U.S. Pat. No. 7,261,807 B2. An exemplary fluid catalytic cracking zone is disclosed in, e.g., U.S. App. No. 61/725,302 filed 12 Nov. 2012.

The oligomerization zone 250 can receive the butene feed 190 and include at least one oligomerization reactor optionally preceded by an optional guard bed for removing catalyst poisons. The butene feed 190 may be preheated before entering at least one oligomerization reactor. The at least one oligomerization reactor may contain a first catalyst bed of oligomerization catalyst. The reactor can contain any suitable catalyst, typically an acid catalyst such as a zeolite or at least one of a solid phosphoric acid and sulfonic acid ion exchange resin catalyst, as disclosed in, e.g., U.S. Pat. No. 7,601,309 and US 2009/0221862 A1.

Typically, the oligomerization zone 250 can operate at a temperature of about 70° to about 300° C. or even about 70° to about 150° C., and a pressure of about 1,200 to about 8,375 kPa. Such oligomerization catalyst and conditions are disclosed in, e.g., US 2012/0149956. The oligomerization reactor may be an upflow reactor to provide a uniform feed front through the catalyst bed, but other flow arrangements are contemplated. In one aspect, the first oligomerization reactor may contain an additional bed or beds of oligomerization catalyst. The one or more C4 alkenes in the butene feed 190 can oligomerize over the oligomerization catalyst to provide an oligomerate having one or more C4 alkene dimers and trimers. Any C5 alkenes that may be present in the oligomerization feed stream may oligomerize over the oligomerization catalyst to provide an oligomerate including C5 alkene dimers and trimers and co-oligomerize with C4 alkenes to make C9 alkenes. The oligomerization zone 250 may produce other oligomers with additional carbon numbers.

Oligomerization effluent from the first bed may optionally be quenched with a liquid such as recycled oligomerate. The liquid oligomerate may also include oligomerized alkenes that can react with the C4 alkenes and C5 alkenes in the feed and other oligomerized alkenes if present to make diesel range alkenes. Oligomerized product, also known as oligomerate, can exit the at least one oligomerization reactor as an oligomerized effluent 254. In addition, a second oligomerization reactor may be used in series with the first oligomerization reactor. An exemplary oligomerization zone 250 is disclosed in, e.g., U.S. App. No. 61/725,302 filed 12 Nov. 2012.

The heavy naphtha or first stream 174 from the fluid catalytic cracking zone 150 may be combined with a heavy naphtha stream 328 from the another fluid catalytic cracking zone 300 to form the combined feed 380 provided to the gasoline hydrotreatment zone 400. The combined feed 380 can be provided to the gasoline hydrotreatment zone 400 along with a hydrogen stream 404 to selectively remove sulfur. The gasoline hydrotreatment zone 400 can include a hydrotreating catalyst or a combination of hydrotreating catalysts, and operated at conditions effective to convert a majority of the sulfur to hydrogen sulfide and minimize alkene saturation. In general, such selective conditions may include a temperature of about 260° to about 315° C., a pressure of about 0.6 to about 3.5 MPa, and a liquid hourly space velocity of the combined feed 380 of about 0.5 to about 10 hr$^{-1}$. Other hydrotreating conditions are also possible depending on the particular feeds being treated. The gasoline treatment zone 400 may contain a single or multiple reactors and each reactor may contain one or more reaction zones with the same or different catalysts to convert sulfur and nitrogen to hydrogen sulfide and ammonia.

Suitable hydrotreating catalysts can include at least one metal of groups 6 and 8-10 of the periodic table. Such metals can include iron, cobalt, nickel, molybdenum, and/or tungsten on a high surface area support material, such as alumina. Other suitable hydrotreating catalysts may include zeolitic catalysts, as well as noble metal catalysts where the noble metal is selected from palladium and platinum. Typically, the metal of groups 8-10 is present in an amount of about 0.5 to about 20%, by weight, and the group 6 is present in an amount of about 1 to about 25%, by weight. In general, conditions may include a temperature of about 310° to about 400° C., a pressure of about 0.6 to about 3.5 MPa, a liquid hourly space velocity of the combined feed 380 of about 0.5 to about 15 hr$^{-1}$. The another stream or hydrotreated effluent 408 can be no more than about 1 to about 5 ppm, by weight. An exemplary gasoline hydrotreatment zone 400 is disclosed in, e.g., U.S. Pat. No. 7,749,375.

The another stream 408 from the gasoline hydrotreatment zone 400 may be provided to an adsorption zone 420 for removing at least one heteroatom compound having a sulfur or a nitrogen atom compound. The adsorption zone 420 can include any suitable molecular sieve, such as a zeolitic material. Suitable zeolites include those having a structure from one of the following classes MFI, MEL, ITH, IMF, TUN, FER, BEA, FAU, BPH, MEI, MSE, MWW, UZM-8, MOR, OFF, MTW, TON, MTT, AFO, ATO, and AEL. Such a zeolite material can reduce the concentration of sulfur and/or nitrogen compounds in the another stream 408 from no more than about 1 to about 5 ppm, by weight, to less than about 0.5 ppm, by weight, of sulfur and/or nitrogen compounds.

The adsorption zone 420 can produce an effluent 424 that may be combined with a hydrocracking effluent 472 from the hydrocracking zone 460 to form a combined feed 426 for the BTX extraction zone 440. The combined feed 426 containing one or more C6$^+$ hydrocarbons can be fed to a BTX extraction zone 440 for recovery of BTX compounds and production of a BTX stream 448, which can be sent to any subsequent processing for the manufacture of, e.g., plastics and/or polymers. Exemplary BTX process units are described in, e.g., U.S. Pat. No. 6,004,452 and U.S. Pat. No. 7,611,622.

The BTX extraction zone 440 can produce a raffinate stream 444 that can be provided to the hydrocracking zone 460 along with a feed 244 from the fluid catalytic cracking zone 150, as described above, and a hydrogen stream 468. The hydrocracking zone 460 can produce one or more C4– alkanes 464 along with a hydrocracked effluent 472.

The feed 244, which may include a light cycle oil stream 180 from the fluid catalytic cracking zone 150 and a light cycle oil stream 332 from the another fluid catalytic cracking zone 300, may be provided to the hydrocracking zone 460. The hydrocracking zone 460 may contain one or more beds of the same or different catalyst. In one embodiment, when the preferred products are middle distillates, the preferred hydrocracking catalysts utilize amorphous bases or low-level zeolite bases combined with one or more metal hydrogenating components of groups 6 and 8-10 of the periodic table. Specific metals can include iron, cobalt, nickel, ruthenium, rhodium, palladium, osmium, iridium, platinum, molybdenum and tungsten in an amount of about 0.05 to about 30%, by weight. In another embodiment, a minor proportion of one or more metals of groups 6 and 8-10 of the Periodic Table can be deposited upon any suitable crystalline zeolite cracking base. The zeolite cracking bases are sometimes referred to as molecular sieves and are usually composed of silica, alumina and one or more exchangeable cations such as sodium, magnesium, calcium, and rare earth metals. They are further characterized by crystal pores of relatively uniform diameter between about 4 to about 14 Angstroms. Additional metal promoted hydrocracking catalysts may also be utilized, e.g., aluminophosphate molecular sieves, crystalline chromosilicates and other crystalline silicates.

The hydrocracking conditions may be conducted in the presence of hydrogen and at a temperature of about 230° to about 470° C., a pressure of about 3,400 to about 21,000 KPa, a liquid hourly space velocity of about 0.1 to about 30 $hr^{-1}$, and a hydrogen circulation rate of about 330 to about 4,200 normal $m^3/m^3$. An exemplary hydrocracking zone is disclosed in, e.g., U.S. Pat. No. 6,296,758.

The bottom stream 138 from the fractionation zone 130 can be provided to another fluid catalytic cracking zone 300, which can include a riser reactor 320 and a combustion regenerator 360. The riser reactor 320 may receive the bottom stream 138 and be in fluid communication with the combustion regenerator 360 to receive a spent catalyst stream 336 and provide a regenerated catalyst stream 340. The catalyst can be any suitable catalyst, such as catalyst disclosed for the fluid catalytic cracking zone 150. In one preferred embodiment, a low activity catalyst may be utilized in the riser reactor 320. The riser reactor 320 can crack the bottom stream 138 containing hydrocarbons ranging from methane through relatively high boiling point materials along with hydrogen and hydrogen sulfide. The cracked products from the riser reactor 320 may optionally be provided to a distillation column to separate a light naphtha sent in the line 324 to the second riser reactor 200, a heavy naphtha sent in the line 328 to form the feed 380, and a light cycle oil sent in the line 332 to form the feed 244.

The combustion regenerator 360, which may undertake full or partial combustion, can regenerate spent catalyst from the riser reactor 320. The combustion regenerator 360 is configured to receive a fuel gas from an outside source and spent catalyst from the riser reactor 320. The combustion regenerator 360 receives the fuel gas to burn the coke off the spent catalyst, thereby producing a synthesis gas stream 344, which may include carbon monoxide, carbon dioxide, steam, sulfur oxides, and nitrogen. The synthesis gas stream 344 can be further processed for producing ketones and alcohols, which in turn can be made into desired chemical products, such as plastics and/or polymers. Such exemplary riser reactors and combustion regenerators are disclosed in, e.g., U.S. Pat. No. 7,699,974.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

Specific Embodiments

While the following is described in conjunction with specific embodiments, it will be understood that this description is intended to illustrate and not limit the scope of the preceding description and the appended claims.

A first embodiment of the invention is a process for producing a chemical feedstock, comprising A) passing a feed to a hydrotreatment zone; B) passing an effluent from the hydrotreatment zone to a fractionation zone; C) passing a stream comprising one or more C5-C25 hydrocarbons from the fractionation zone to a fluid catalytic cracking zone to obtain an another stream comprising one or more C6-C10 hydrocarbons; and D) passing the another stream to an adsorption zone for removing at least one heteroatom compound having a sulfur or a nitrogen atom. An embodiment of the invention is one, any or all of prior embodiments in this paragraph up through the first embodiment in this paragraph, wherein the another stream is passed through a further hydrotreatment zone prior to the adsorption zone. An embodiment of the invention is one, any or all of prior embodiments in this paragraph up through the first embodiment in this paragraph, wherein the another stream has a content of the at least one heteroatom compound of no more than about 1 to about 5 ppm, by weight. An embodiment of the invention is one, any or all of prior embodiments in this paragraph up through the first embodiment in this paragraph, further comprising passing the another stream to the adsorption zone. An embodiment of the invention is one, any or all of prior embodiments in this paragraph up through the first embodiment in this paragraph, wherein the adsorption zone comprises a molecular sieve. An embodiment of the invention is one, any or all of prior embodiments in this paragraph up through the first embodiment in this paragraph, further comprising obtaining an effluent from the adsorption zone having a content of the at least one heteroatom compound of no more than about 0.5 ppm, by weight. An embodiment of the invention is one, any or all of prior embodiments in this paragraph up through the first embodiment in this paragraph, wherein the stream comprising one or more C5-C25 hydrocarbons has a boiling point range of about 25° to about 410° C., and another stream comprising one or more C6-C10 hydrocarbons has a boiling point range of about 85° to about 190° C. An embodiment of the invention is one, any or all of prior embodiments in this paragraph up through the first embodiment in this paragraph, wherein the fractionation zone further comprises passing an additional stream comprising one or more $C22^+$ hydrocarbons to another fluid catalytic cracking zone. An embodiment of the invention is one, any or all of prior embodiments in this paragraph up through the first embodiment in this paragraph, further comprising passing a hydrocarbon stream to an oligomerization zone. An embodiment of the invention is one, any or all of prior embodiments in this paragraph up through the first embodiment in this paragraph, passing the effluent from the adsorption zone to a benzene, toluene, and xylene extraction zone. An embodiment of the invention is one, any or all of prior embodiments in this paragraph up through the first embodiment in this paragraph, further comprising passing a further stream comprising one or more C13-C18 hydrocarbons to a hydrocracking zone. An embodiment of the invention is one, any or all of prior embodiments in this paragraph up through the first embodiment in this paragraph, wherein the further stream comprising one or more C13-C18 hydrocarbons has a boiling point range of about 200° to about 350° C.

A second embodiment of the invention is an apparatus for producing a chemical feedstock, comprising A) a fluid catalytic cracking zone; B) a gasoline hydrotreatment zone communicating via a line with the fluid catalytic cracking zone for receiving one or more C6-C10 hydrocarbons; and C) an adsorption zone communicating via another line with the gasoline hydrotreatment zone for receiving a hydrotreated effluent. An embodiment of the invention is one, any or all of prior embodiments in this paragraph up through the second embodiment in this paragraph, further comprising a benzene, toluene, and xylene extraction zone in communication via a further line with the adsorption zone. An embodiment of the invention is one, any or all of prior embodiments in this paragraph up through the second embodiment in this paragraph, further comprising a hydrotreatment zone and a fractionation zone in communication with the fluid catalytic cracking zone.

A third embodiment of the invention is a process for producing a chemical feedstock, comprising A) passing a feed to a hydrotreatment zone; B) passing an effluent from the hydrotreatment zone to a fractionation zone; C) passing a stream comprising one or more C5-C25 hydrocarbons to a fluid catalytic cracking zone; D) passing a stream comprising one or more $C22^+$ hydrocarbons to an another fluid catalytic cracking zone to obtain a first stream comprising one or more C6-C10 hydrocarbons and a second stream comprising one or more C13-C18 hydrocarbons; E) passing the first stream to a riser in the fluid catalytic cracking zone; and F) passing the second stream to a hydrocracking zone. An embodiment of the invention is one, any or all of prior embodiments in this paragraph up through the third embodiment in this paragraph, further comprising passing a further stream comprising one or more C13-C18 hydrocarbons from the fluid catalytic cracking zone to the hydrocracking zone. An embodiment of the invention is one, any or all of prior embodiments in this paragraph up through the third embodiment in this paragraph, further comprising passing a hydrotreated effluent from a further hydrotreatment zone to an adsorption zone. An embodiment of the invention is one, any or all of prior embodiments in this paragraph up through the third embodiment in this paragraph, further comprising passing an effluent from the adsorption zone to a benzene, toluene, and xylene extraction zone. An embodiment of the invention is one, any or all of prior embodiments in this paragraph up through the third embodiment in this paragraph, wherein the adsorption zone comprises a molecular sieve.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for producing a chemical feedstock, comprising:
    A) passing a crude oil feed to a hydrotreatment zone;
    B) passing an effluent from the hydrotreatment zone to a fractionation zone to produce a stream comprising one or more C5-C25 hydrocarbons and an additional stream comprising one or more $C22^+$ hydrocarbons;
    C) passing the stream comprising one or more C5-C25 hydrocarbons to a fluid catalytic cracking zone to obtain a further stream comprising one or more C13-18 hydrocarbons;
    D) passing the stream comprising one or more $C22^+$ hydrocarbons to an another fluid catalytic cracking zone to obtain a first stream comprising one or more C6-C10 hydrocarbons and a second stream comprising one or more C13-C18 hydrocarbons;
    E) passing the first stream to a riser in the fluid catalytic cracking zone; and
    F) passing the second stream to a hydrocracking zone to produce an aromatic stream comprising benzene, toluene, and/or xylenes.

2. The process according to claim 1, further comprising obtaining an another stream comprising one or more C6-C10 hydrocarbons from the fluid catalytic cracking zone and passing the another stream to an adsorption zone for removing at least one heteroatom compound having a sulfur or a nitrogen atom to reduce the concentration of sulfur compounds to no more than about 5 ppm by weight.

3. The process according to claim 2, wherein the stream comprising one or more C5-C25 hydrocarbons has a boiling point range of about 25° to about 410° C., and the another stream comprising one or more C6-C10 hydrocarbons has a boiling point range of about 85° to about 190° C.

4. The process according to claim 2, further comprising passing a hydrocarbon stream comprising one or more C4-C5 alkenes to an oligomerization zone.

5. The process according to claim 2, wherein the another stream is passed through a further hydrotreatment zone prior to the adsorption zone.

6. The process according to claim 5, wherein the another stream has a content of the at least one heteroatom compound of no more than about 1 to about 5 ppm, by weight, after the further hydrotreatment.

7. The process according to claim 6, wherein the stream comprising one or more C5-C25 hydrocarbons is a side stream and the additional stream comprising one or more $C22^+$ hydrocarbons is a bottoms stream.

8. The process according to claim 7, wherein the adsorption zone comprises a molecular sieve.

9. The process according to claim 7, further comprising obtaining an effluent from the adsorption zone having a content of the at least one heteroatom compound of no more than about 0.5 ppm, by weight.

10. The process according to claim 9, passing the effluent from the adsorption zone to a benzene, toluene, and xylene extraction zone.

11. The process according to claim 1, further comprising passing the further stream comprising one or more C13-C18 hydrocarbons from the fluid catalytic cracking zone to the hydrocracking zone.

12. The process according to claim 11, wherein the further stream comprising one or more C13-C18 hydrocarbons has a boiling point range of about 200° to about 350° C.

13. The process according to claim 1, further comprising providing the first stream comprising one or more C6-C10 hydrocarbons to a further hydrotreatment zone and passing a hydrotreated effluent from the further hydrotreatment zone to an adsorption zone.

14. The process according to claim 13, further comprising passing an effluent from the adsorption zone to a benzene, toluene, and xylene extraction zone.

15. The process according to claim 13, wherein the adsorption zone comprises a molecular sieve.

* * * * *